United States Patent
Kim et al.

(10) Patent No.: US 11,199,753 B2
(45) Date of Patent: Dec. 14, 2021

(54) BEAM STEERING DEVICE AND SYSTEM INCLUDING THE SAME

(71) Applicant: SAMSUNG ELECTRONICS CO., LTD., Suwon-si (KR)

(72) Inventors: Sunil Kim, Osan-si (KR); Changgyun Shin, Anyang-si (KR); Jungwoo Kim, Hwaseong-si (KR); Duhyun Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 136 days.

(21) Appl. No.: 16/700,234

(22) Filed: Dec. 2, 2019

(65) Prior Publication Data

US 2020/0103722 A1    Apr. 2, 2020

Related U.S. Application Data (63) Continuation of application No. 15/355,710, filed on Nov. 18, 2016, now Pat. No. 10,503,043.

(30) Foreign Application Priority Data

Nov. 27, 2015 (KR) .................. 10-2015-0167506

(51) Int. Cl.
  *G02F 1/29*     (2006.01)
  *G02F 1/13357*  (2006.01)
  *G02F 1/1335*   (2006.01)
  *B82Y 20/00*    (2011.01)

(52) U.S. Cl.
  CPC .......... *G02F 1/29* (2013.01); *G02F 1/133602* (2013.01); *G02F 1/292* (2013.01); *B82Y 20/00* (2013.01); *G02F 1/133614* (2021.01); *G02F 2201/34* (2013.01); *G02F 2202/10* (2013.01); *G02F 2202/36* (2013.01); *G02F 2203/24* (2013.01); *Y10S 977/932* (2013.01)

(58) Field of Classification Search
  CPC ... G02F 1/19; G02F 1/01; G02F 1/292; G02F 2001/0151; G02F 2203/24; G02F 1/29; G02F 1/133602; G02F 1/133614; G02F 2201/34; G02F 2202/10; G02F 2202/36; G02B 5/08; H01Q 15/02; H01Q 15/10; H01Q 9/0414; Y10S 977/932; B82Y 20/00
  See application file for complete search history.

(56) References Cited

U.S. PATENT DOCUMENTS

| | | |
|---|---|---|
| 5,253,033 A | 10/1993 | Lipchak et al. |
| 6,016,122 A | 1/2000 | Malone et al. |
| 6,611,367 B1 | 8/2003 | Naya et al. |
| 6,982,819 B2 | 1/2006 | Sawin et al. |
| 7,773,228 B1 | 8/2010 | Hollingsworth et al. |
| 8,045,107 B2 | 10/2011 | Tang et al. |
| 8,674,792 B2 | 3/2014 | Yonak et al. |
| 9,104,086 B1 | 8/2015 | Davids et al. |
| 9,202,696 B2 | 12/2015 | Yang et al. |

(Continued)

FOREIGN PATENT DOCUMENTS

KR   10-2011-0070461 A    6/2011

*Primary Examiner* — Balram T Parbadia
(74) *Attorney, Agent, or Firm* — Sughrue Mion, PLLC (57) ABSTRACT

Provided are a beam steering device and a system including the same. The beam steering device includes a conversion layer having a refractive index which is variable via electrical control and a plurality of nanoantenna pattern layers stacked on the conversion layer. The refractive index of the conversion layer is electrically changed by a driver.

18 Claims, 4 Drawing Sheets

(56) References Cited

U.S. PATENT DOCUMENTS

| | | |
|---|---|---|
| 9,632,216 B2 | 4/2017 | Han et al. |
| 9,817,250 B2 | 11/2017 | Han et al. |
| 2004/0080803 A1 | 4/2004 | Otsuka et al. |
| 2011/0148704 A1 | 6/2011 | Kim |
| 2012/0170097 A1 | 7/2012 | Han et al. |
| 2013/0208332 A1 | 8/2013 | Yu et al. |
| 2014/0085693 A1 | 3/2014 | Mosallaei et al. |
| 2014/0224989 A1 | 8/2014 | Long et al. |
| 2014/0240812 A1 | 8/2014 | Han et al. |
| 2015/0084814 A1 | 3/2015 | Rojanski et al. |
| 2015/0130673 A1 | 5/2015 | Ng et al. |
| 2015/0146180 A1 | 5/2015 | Lee et al. |
| 2015/0222350 A1 | 8/2015 | Shi |
| 2015/0242664 A1 | 8/2015 | Tuttle |
| 2015/0355410 A1 | 12/2015 | Park et al. |
| 2016/0054596 A1 | 2/2016 | Lee et al. |

BEAM STEERING DEVICE AND SYSTEM INCLUDING THE SAME

CROSS-REFERENCE TO RELATED APPLICATION

This application is a Continuation Application of U.S. patent application Ser. No. 15/355,710, filed Nov. 18, 2016, which claims priority from Korean Patent Application No. 10-2015-0167506, filed on Nov. 27, 2015, in the Korean Intellectual Property Office, the disclosure of which is incorporated herein in its entirety by reference.

BACKGROUND

1. Field

Apparatuses and systems consistent with exemplary embodiments relate to a beam steering device capable of steering a beam in a non-mechanical manner and a system including the beam steering device.

2. Description of the Related Art

In a mechanical beam steering device, a beam emission part is mechanically rotated, via a motor or the like, in order to steer a beam to a desired location. In other words, light emitted from a laser diode or a light-emitting diode, for example, is steered by a rotation of an entire beam emission part. Since a motor or the like must be included in a mechanical beam steering system, the volume and cost of such a steering system is high and the system may be quite noisy due to the use of the motor. One example of a non-mechanical beam steering system includes a microelectromechanical system (MEMS) mirror. However, a MEMS mirror-based non-mechanical beam steering system has a narrow field of emission, and when high-power light is emitted, a transfer distance of the light may be short due to stress applied to the mirror.

SUMMARY

One or more exemplary embodiments may provide a beam steering device which steers a beam in a non-mechanical manner and has improved beam directivity and a system including the beam steering device.

Additional exemplary aspects and advantages will be set forth in part in the description which follows and, in part, will be apparent from the description, or may be learned by practice of the presented exemplary embodiments.

According to an aspect of an exemplary embodiment, a beam steering device includes: a conversion layer of which refractive index is variable via electrical control; a driver configured to electrically change the refractive index of the conversion layer; and a plurality of nanoantenna pattern layers stacked on the conversion layer.

The beam steering device may further include a reflective mirror layer between the conversion layer and the driver.

The conversion layer may be between the reflective mirror layer and the plurality of nanoantenna pattern layers.

An insulating material may be filled between the conversion layer and the reflective mirror layer.

The reflective mirror layer may include a metal pattern layer.

An insulating material may be filled between metal patterns of the reflective mirror layer.

The reflective mirror layer may be overall formed of a metal material.

The reflective mirror layer and the plurality of nanoantenna pattern layers may be formed of a same metal material.

An insulating layer may be between the plurality of nanoantenna pattern layers such that the plurality of nanoantenna pattern layers are spaced apart from each other.

The plurality of nanoantenna pattern layers may include: an upper nanoantenna pattern layer located at an uppermost layer; and at least one lower nanoantenna pattern layer, wherein an insulating material is filled between nanoantenna patterns of the at least one lower nanoantenna pattern layer.

Each of the plurality of nanoantenna pattern layers may include a plurality of nanoantenna elements arranged in an array in each unit cell.

The plurality of nanoantenna elements may have a same size in each unit cell.

A size of the nanoantenna elements may vary for each unit cell.

Each of the plurality of nanoantenna pattern layers may include at least one selected from the group consisting of gold (Au), silver (Ag), titanium nitride (TiN), tantalum nitride (TaN), platinum (Pt), aluminum (Al), and an alloy thereof.

The conversion layer may include an oxide semiconductor material.

The conversion layer may include at least one of indium tin oxide (ITO), indium zinc oxide (IZO), gallium indium zinc oxide (GIZO), zinc oxide (ZnO), aluminum zinc oxide (AZO), and gallium zinc oxide (GZO).

A size of nanoantenna elements and a gap between the nanoantenna elements in each of the plurality of nanoantenna pattern layers may be less than a wavelength of a beam incident on the plurality of nanoantenna pattern layers.

According to an aspect of another exemplary embodiment, a system includes: a beam steering device configured to steer an incident beam such that the incident beam is reflected at a desired angle and having the features described above; a driving circuit configured to electrically change the refractive index of the conversion layer of the beam steering device; and a light source configured to emit the incident beam to the beam steering device.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

A beam steering device and a system employing the same according to exemplary embodiments will now be described in detail with reference to the accompanying drawings. In the drawings, like reference numerals refer to like elements, and the sizes and thicknesses of components may be exaggerated for convenience of description. In this regard, the exemplary embodiments may have different forms and should not be construed as being limited to the descriptions set forth herein. Accordingly, the embodiments are merely exemplary descriptions, referring to the figures, used to explain various aspects. In the description below, when it is described that a certain layer is provided "on", "on an upper part of", or "above" a substrate or another layer, the certain layer may be in direct contact with and above the substrate or another layer, or a third layer may be interposed therebetween. As used herein, expressions such as "at least one of," when preceding a list of elements, modify the entire list of elements and do not modify the individual elements of the list.

Figure 1:
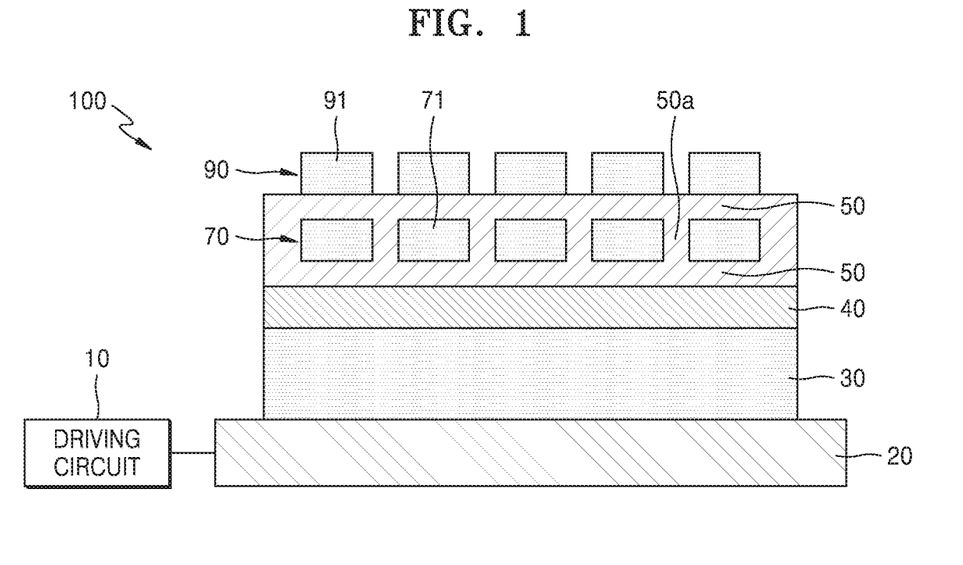
FIGS. 1, 2, and 3 each illustrate a structure of a beam steering device, according to an exemplary embodiment.
Figure 2:
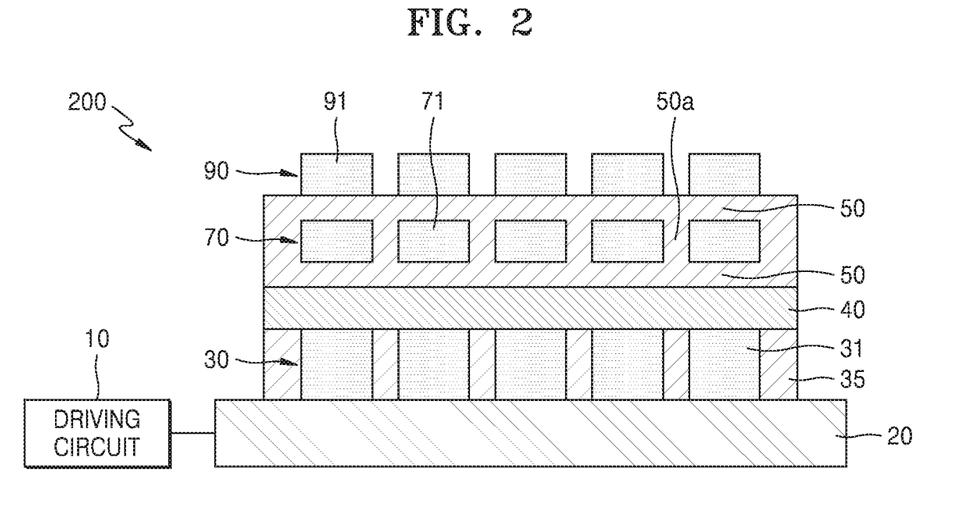
Figure 3:
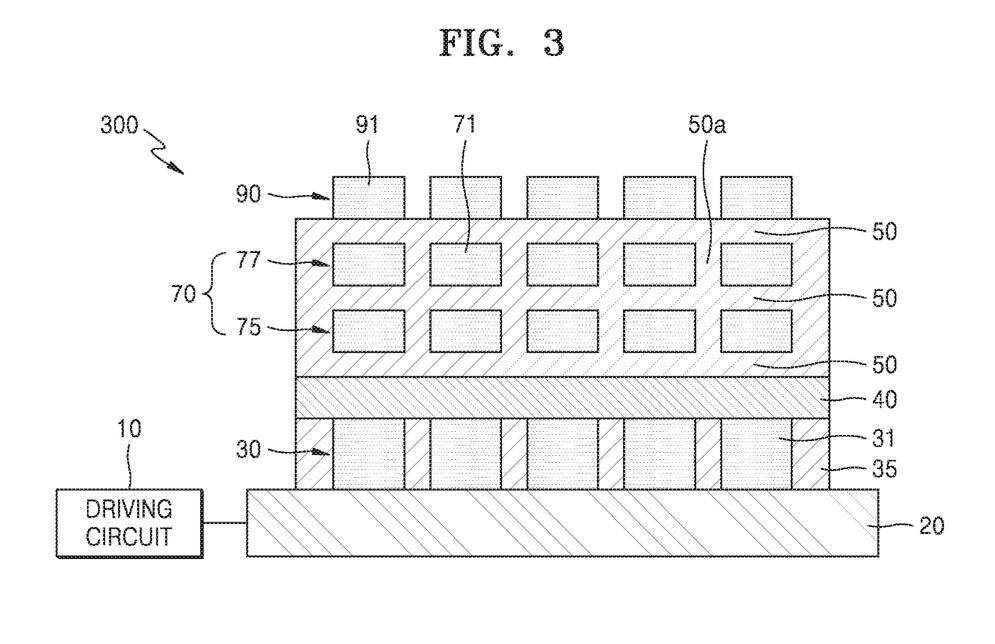

FIGS. 1, 2, and 3 illustrate structures of beam steering devices 100, 200, and 300, respectively, according to exemplary embodiments. The beam steering device 200 of FIG. 2 differs from the beam steering devices 100 and 300 of FIGS. 1 and 3 in the structure of a reflective mirror layer 30. The beam steering device 300 of FIG. 3 differs from the beam steering devices 100 and 200 of FIGS. 1 and 2 in a number of stacks of nanoantenna pattern layers 70 and 90.

Referring to FIGS. 1 through 3, each of the beam steering devices 100, 200 and 300 includes a conversion layer 40 which comprises a refractive index which is variable via electrical control, the plurality of nanoantenna pattern layers 70 and 90 stacked on the conversion layer 40, and a driver 20 configured to electrically change the refractive index of the conversion layer 40. In the beam steering devices 100, 200 and 300, the driver 20, the conversion layer 40, and the plurality of nanoantenna pattern layers 70 and 90 may be stacked in order. A reflective mirror layer 30 may be further included between the conversion layer 40 and the driver 20. FIGS. 2 and 3 show examples in which the reflective mirror layer 30 is formed as a pattern layer 31.

The stacked structures of FIGS. 1 through 3 illustrate unit cells of the beam steering devices 100, 200 and 300, respectively, and each of the beam steering devices 100, 200 and 300 may have a form in which a plurality of the stack structures are arranged in an array.

The conversion layer 40 may include a transparent oxide semiconductor material, e.g., a transparent conductive material, having a refractive index is changeable according to an applied voltage. For example, the conversion layer 40 may include at least one of indium tin oxide (ITO), indium zinc oxide (IZO), gallium indium zinc oxide (GIZO), zinc oxide (ZnO), aluminum zinc oxide (AZO), and gallium zinc oxide (GZO).

When charge accumulation in the conversion layer 40 is controlled by an applied voltage, the refractive index of the conversion layer 40 may be changed, and accordingly, beam steering using a metasurface may be performed.

The plurality of nanoantenna pattern layers 70 and 90 may each comprise a metal material so that beam steering using a metasurface may be achieved and so that the devices have structures including a plurality of stacked layers. As such, when the nanoantenna pattern layers 70 and 90 are stacked in a plurality of layers, directivity is improved, thereby maximizing the intensity of a beam steered to a certain location. As another example, the plurality of nanoantenna pattern layers 70 and 90 may include a dielectric material.

The plurality of nanoantenna pattern layers 70 and 90 may include, for example, an upper nanoantenna pattern layer 90, disposed as the uppermost layer, and a lower nanoantenna pattern layer 70, disposed between the upper nanoantenna pattern layer 90 and the conversion layer 40. As shown in FIGS. 1 and 2, the plurality of nanoantenna pattern layers 70 and 90 may include two nanoantenna pattern layers, wherein the lower nanoantenna pattern layer 70 is a single layer. However, the plurality of nanoantenna pattern layers 70 and 90 may include three or more nanoantenna pattern layers in a stacked form in which the lower nanoantenna pattern layer 70 includes two or more layers. FIG. 3 illustrates the beam steering device 300 in which the plurality of nanoantenna pattern layers 70 and 90 includes three layers, according to an exemplary embodiment, in which the lower nanoantenna pattern layer 70 includes two nanoantenna pattern layers 75 and 77.

The upper nanoantenna pattern layer 90, disposed as the uppermost layer, may correspond to a director antenna. By also including the lower nanoantenna pattern layer 70, the directivity of the beam steering devices 100, 200 and 300 may be improved. The reflective mirror layer 30 may be patterned and used as a reflector.

Each of the nanoantenna pattern layers 70 and 90 may be formed using a metal material. For example, each of the nanoantenna pattern layers 70 and 90 may include at least one selected from the group consisting of gold (Au), silver (Ag), titanium nitride (TiN), tantalum nitride (TaN), platinum (Pt), aluminum (Al), and an alloy thereof.

Each of the nanoantenna pattern layers 70 and 90 may include a plurality of nanoantenna elements 71 or 91, disposed in an array in each unit cell. Although FIGS. 1 through 3 show that five nanoantenna elements 71 or 91 are provided in each layer in a single unit cell, this is only illustrative, and the number of nanoantenna elements 71 or 91 arranged in each unit cell may be variously modified.

Figure 4:
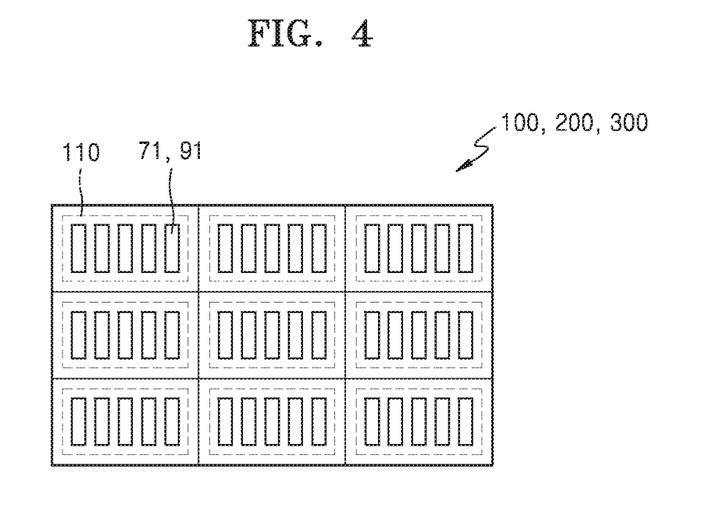
FIG. 4 illustrates an arrangement of a plurality of nanoantenna elements in a beam steering device, according to an exemplary embodiment.
Figure 5:
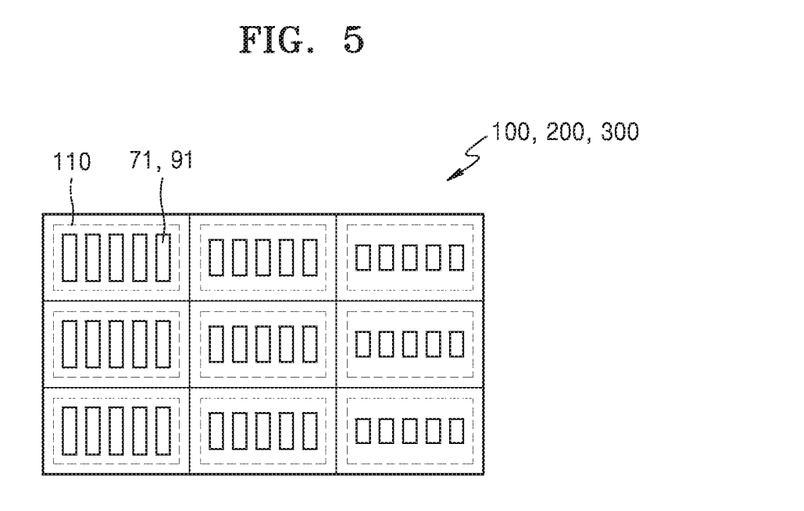
FIG. 5 illustrates an arrangement of a plurality of nanoantenna elements in a beam steering device, according to another exemplary embodiment.

The plurality of nanoantenna elements 71 or 91 may have the same size. Alternately, the size of the plurality of nanoantenna elements in one unit cell may be different from the size of the plurality of nanoantenna elements in a different unit cell. For example, as shown in FIG. 4, the plurality of nanoantenna elements 71 or 91 may have the same shape and size in all unit cells 110. Alternatively, as shown in FIG. 5, the plurality of nanoantenna elements 71 or 91 in each unit cell may have the same shape and size within the unit cell, but the size and shape of the plurality of nanoantenna elements in one unit cell 110 may differ from the size and/or shape of the plurality of nanoantenna elements in other unit cells. The size and/or shape of the plurality of nanoantenna elements 71 or 91 may gradually decrease or increase from one unit cell to another within an array of unit cells, as shown in FIG. 5.

Although FIGS. 4 and 5 show that the plurality of nanoantenna elements 71 or 91 are rectangular, the plurality of nanoantenna elements 71 or 91 may be formed in a circular, oval, polygonal or irregular shape instead. In addition, the plurality of nanoantenna elements 71 or 91 may be aligned such that arrays of the elements include certain gaps or may have irregularly arranged patterns or arrays.

The nanoantenna elements 71 or 91 may have different sizes according to which of the plurality of nanoantenna pattern layers 70 and 90 they are in. For example, a size of the nanoantenna elements 91 located in the upper nanoantenna pattern layer 90 may be smaller than a size of the nanoantenna elements 71 located in the lower nanoantenna pattern layer 70. When the lower nanoantenna pattern layer 70 includes two or more layers, the size of the nanoantenna elements 71 may gradually decrease from the lowest of the layers toward the upper nanoantenna pattern layer 90. As another example, the plurality of nanoantenna pattern layers 70 and 90 may include the nanoantenna elements 71 or 91 having the same size regardless of which layer they are in. That is, the nanoantenna elements 71 or 91 located in the plurality of nanoantenna pattern layers 70 and 90 may have a same size regardless of locations in a depth direction of the beam steering devices 100, 200 and 300, or they may have sizes which gradually decrease or increase from the lowest layer to the uppermost layer.

The size of the nanoantenna elements 71 or 91 in each unit cell 110 of the plurality of nanoantenna pattern layers 70 and 90 and the gap between the nanoantenna elements 71 and 91 may be smaller than a wavelength of a beam incident on the plurality of nanoantenna pattern layers 70 and 90, i.e., a beam to be steered. For example, the size and gap of the nanoantenna elements 71 and 91 may be about a half or one third or less of the wavelength of the beam to be steered. The size and gap of the nanoantenna elements 71 and 91 may vary within a range in which each of the beam steering devices 100, 200, and 300, according to an exemplary embodiment, steers a beam to a desired location by reflecting and diffracting the beam with desired optical efficiency.

Referring back to FIGS. 1 through 3, an insulating layer 50 may be formed between the plurality of nanoantenna pattern layers 70 and 90 such that the plurality of nanoantenna pattern layers 70 and 90 are spaced apart from each other. The insulating layer 50 may also be formed between the lower nanoantenna pattern layer 70 and the conversion layer 40. In addition, an insulating material 50a may be filled between the nanoantenna elements 71 of the lower nanoantenna pattern layer 70, such that the nanoantenna elements 71 of the lower antenna pattern layer 70 are each surrounded by insulating material.

The insulating layer 50 between the plurality of nanoantenna pattern layers 70 and 90 and between the lower nanoantenna pattern layer 70 and the conversion layer 40 and the insulating material 50a filled between the nanoantenna elements 71 of the lower nanoantenna pattern layer 70 may include the same material or two or more different materials.

The insulating layer 50 between the plurality of nanoantenna pattern layers 70 and 90 and the insulating material 50a filled between the nanoantenna elements 71 may include at least one of various types of insulating materials, e.g., aluminum oxide ($Al_2O_3$), hafnium oxide ($HfO_2$), zirconium oxide ($ZrO_2$), silicon oxide ($SiO_2$), and silicon nitride ($SiN_4$).

The reflective mirror layer 30 is configured to improve the optical efficiency of the beam steering devices 100, 200, and 300 by reflecting an incident beam and may include a metal material. The reflective mirror layer 30 may include a metal pattern layer 31 as shown in FIGS. 2 and 3. For example, an insulating material 35 may be filled between metal patterns of the metal pattern layer 31. Alternately, the reflective mirror layer 30 may include a simple metal layer without a pattern as shown in FIG. 1.

The reflective mirror layer 30 may include the same metal material as that of the plurality of nanoantenna pattern layers 70 and 90. Alternatively, the reflective mirror layer 30 may include a metal material which is different from that of the plurality of nanoantenna pattern layers 70 and 90.

The reflective mirror layer 30 is configured to act as an electrode for the conversion layer 40. That is, when a voltage controlled by the driver 20 through the reflective mirror layer 30 is applied to the conversion layer 40, charge accumulation in the conversion layer 40 may vary, thereby changing the refractive index of the conversion layer 40.

As shown in FIGS. 2 and 3, the reflective mirror layer 30 may include the metal pattern layer 31 and may be patterned to correspond to the plurality of nanoantenna pattern layers 70 and 90, thereby also functioning as an additional nanoantenna pattern layer.

In the beam steering devices 100, 200, and 300 as shown in FIGS. 1 through 3, the driver 20 is configured to apply a voltage to the conversion layer 40 so as to change refractive index of the conversion layer 40 according to a change in the charge accumulation in the conversion layer 40. The driver 20 may include one transistor and one capacitor. A driving circuit 10 including the driver 20 may include a digital-to-analog converter (DAC) for applying a voltage to a cell array including the driver 20 including one transistor and one capacitor, and a scanner or a selector for selecting a certain column. The driver 20 in each unit cell may include a capacitor, which is a storage space, and a transistor for writing a certain voltage by accessing the capacitor. An upper plate of the capacitor in each cell may be one-to-one connected to each unit cell of the beam steering devices 100, 200, and 300 to drive the conversion layer 40 of each unit cell 110 of the beam steering devices 100, 200, and 300 by the voltage stored in the capacitor.

At a first time, voltages of a certain pattern may be written in a plurality of cells of the driving circuit 10 to drive the cell array in the beam steering device 100, 200, or 300 in a pattern configured for beam steering at a certain angle, and at a second time, voltages of a changed pattern may be written to drive the cell array in the beam steering device 100, 200, or 300 in a pattern configured for beam steering at a second angle, and such operations may be repeated to rotate a beam.

Figure 6:
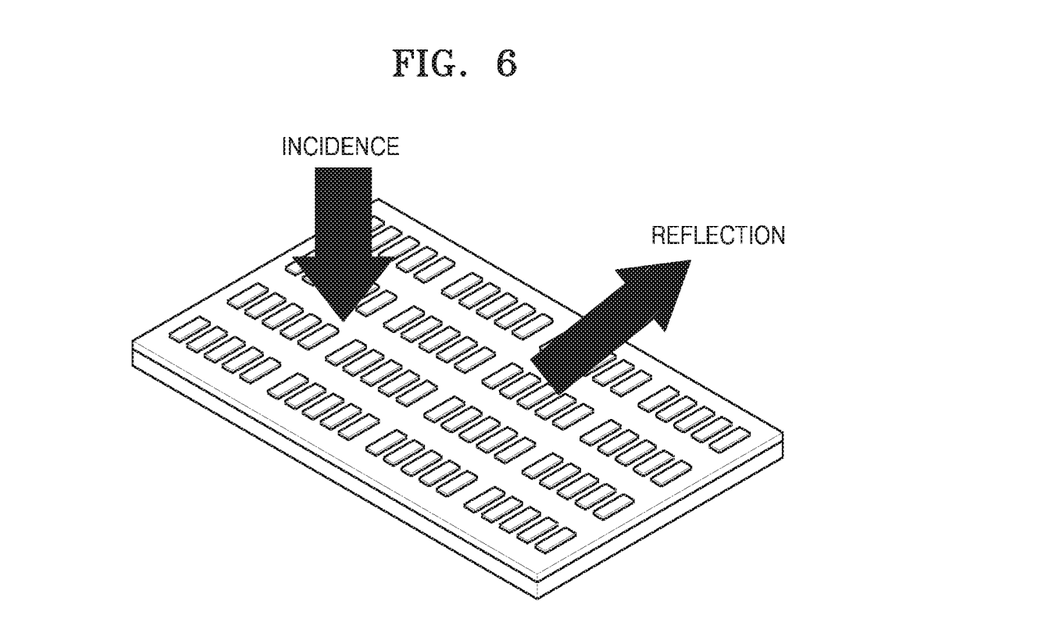
FIG. 6 illustrates an operation of a beam steering device, according to an exemplary embodiment.

FIG. 6 illustrates an operation of the beam steering device 100, 200, or 300, according to an exemplary embodiment.

As shown in FIG. 6, when a beam is incident on the beam steering device 100, 200, or 300, the beam steering device 100, 200, or 300 reflects the beam at a certain angle. In this case, a traveling direction of the reflected beam may vary according to the voltage input to the conversion layer 40. When the driver 20 controls charge accumulation in the conversion layer 40, the refractive index of the conversion layer 40 is changed. The incident beam is reflected from the plurality of nanoantenna pattern layers 70 and 90 according to the value of the changed refractive index and is emitted at a desired angle.

As a voltage applied to the conversion layer 40 of the beam steering device 100, 200, or 300 increases, the charge accumulation in the conversion layer 40 increases, and as the charge accumulation increases, the amount of phase shift applied to the beam reflected from the plurality of nanoantenna pattern layers 70 and 90 also increases. The phase shift amount may vary in proportion to the charge accumulation on the conversion layer 40. The plurality of nanoantenna pattern layers 70 and 90 diffract and reflect the incident beam, and in this case, a reflected diffraction angle may be controlled by adjusting a phase shift amount according to the change in the refractive index of the conversion layer 40 for each pixel.

Figure 7:
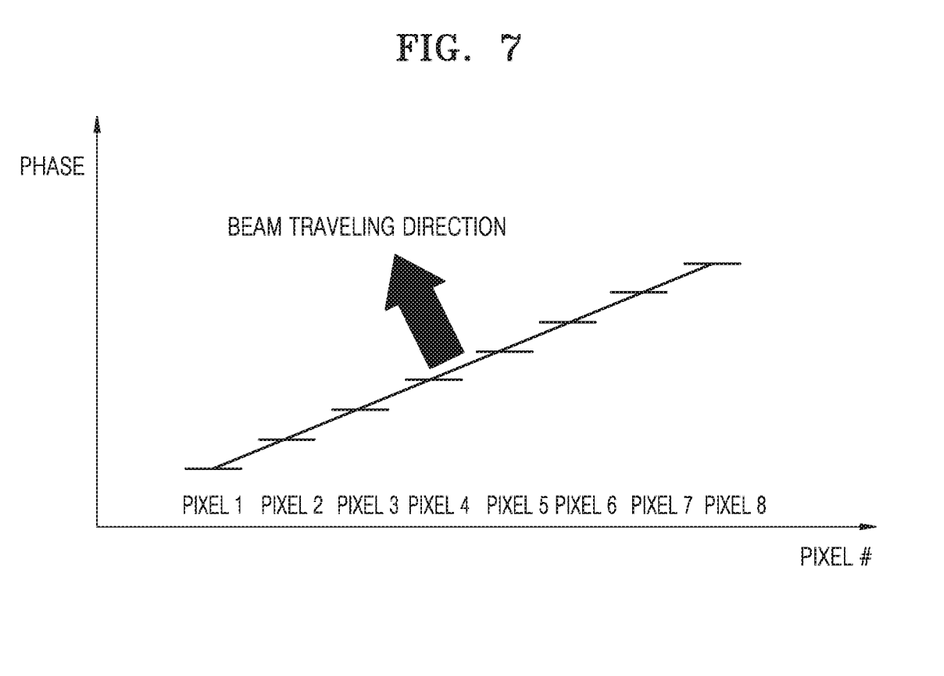
FIG. 7 illustrates a change in a phase shift amount for each pixel.

FIG. 7 illustrates a change in a phase shift amount for each of a plurality of pixels.

As shown in FIG. 7, a traveling direction of a beam, i.e. the direction in which the beam is reflected, may be determined by increasing or decreasing the phase of each pixel by a certain amount. In this case, the traveling direction of a beam may be changed according to the change of the phase of the pixel from which the beam is reflected.

Therefore, a diffraction angle may be changed by adjusting the phase shift amount.

Thus, using the beam steering devices 100, 200, and 300 according to exemplary embodiments, beam directivity may be changed according to various arrangements of the nanoantenna elements 71 and 91 stacked in a plurality layers.

For example, as compared to an arrangement in which a single nanoantenna element 71 or 91 is included in each of three layers, an arrangement in which a 2×2 array of nanoantenna elements 71 or 91 is included in each layer may provide improved directivity. As compared to the arrangement of the 2×2 array of nanoantenna elements included in each layer, an arrangement in which a 3×3 array of nanoantenna elements is included in each layer may also provide improved directivity.

According to exemplary embodiments, each of the beam steering devices 100, 200, and 300 have a structure in which the plurality of nanoantenna pattern layers 70 and 90 are stacked, and, in each unit cell, each of the plurality of nanoantenna pattern layers includes an arrangement of an m×n array of nanoantenna elements 71 or 91 (where each of m and n is an integer of 2 or more), and thus, beam directivity may be significantly improved.

Although the beam steering devices 100, 200, and 300 according to exemplary embodiments have been described by illustrating the structures shown in FIGS. 1 through 5, the exemplary embodiments are not limited thereto. The exemplary embodiments are only illustrative and may be variously modified.

Figure 8:
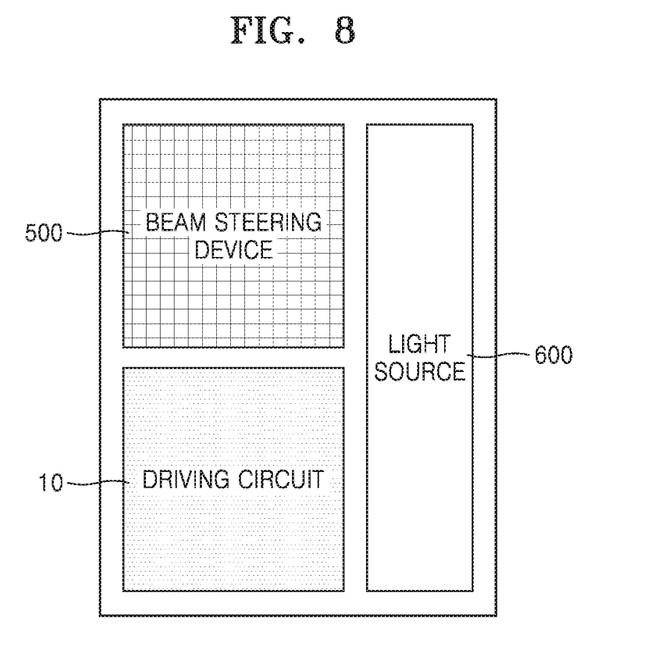
FIG. 8 illustrates a system including a beam steering device, according to an exemplary embodiment.

FIG. 8 illustrates a system employing a beam steering device 500, according to an exemplary embodiment.

Referring to FIG. 8, the system employing the beam steering device 500, according to an exemplary embodiment, may be utilized as, for example, a solid state meta light detection and ranging (LiDAR) system and may include the beam steering device 500 in a meta-photonic chip form, the driving circuit 10, and a light source 600. The beam steering device 500 may be configured as any one of the beam steering devices 100, 200, and 300 according to exemplary embodiments.

The light source 600 may be, for example, a laser light source such as a laser diode or a light source such as a light-emitting diode, though these are merely examples, and any of various light sources may be used. When a laser light source is used for the light source 600, the beam steering device 500 steers a laser beam toward a desired location.

The beam steering device 500 and the system employing the same according to the present exemplary embodiment have structures in which the plurality of nanoantenna pattern layers 70 and 90 are stacked, and thus, beam reflection efficiency and beam directivity toward a desired location may be significantly improved, and a beam directivity characteristic may be further improved by adjusting the sizes of and the gaps between and among the nanoantenna elements 71 and 91.

In addition, the beam steering device 500 and the system employing the same according to exemplary embodiments may have improved beam directivity characteristics, and thus, any optical system portion used for preventing beam spread may be minimized or removed, thereby simplifying the system.

According to one or more exemplary embodiments, a beam steering device includes a conversion layer having a refractive index is variable via electrical control and a plurality of nanoantenna pattern layers stacked on the conversion layer, and thus, a beam steering device and a system in which a beam is steered in a non-mechanical manner, i.e., an electrical control manner, with significantly improved beam reflection efficiency and beam directivity toward a desired location may be realized.

A beam steering device and a system employing the same according to one or more exemplary embodiments may provide improved beam directivity characteristics, and thus any optical system portion used for preventing beam spread may be minimized or removed, thereby simplifying the system.

It should be understood that exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A beam steering device comprising:
   a conversion layer comprising a material with a refractive index which is variable via electrical control;
   a driver configured to electrically change the refractive index of the conversion layer;
   a plurality of nanoantenna pattern layers comprising an upper nanoantenna pattern layer and a lower nanoantenna pattern layer vertically stacked on the conversion layer, such that the lower nanoantenna pattern layer is disposed between the conversion layer and the upper nanoantenna pattern layer; and
   an insulating layer disposed between the upper nanoantenna pattern layer and the lower nanoantenna pattern layer,
   wherein each of the plurality of nanoantenna pattern layers comprises an array of a plurality of nanoantenna elements, and a size of the nanoantenna elements located in the upper nanoantenna pattern layer is different from a size of the nanoantenna elements located in the lower nanoantenna pattern layer.

2. The beam steering device of claim 1, further comprising a reflective mirror layer disposed between the conversion layer and the driver.

3. The beam steering device of claim 2, wherein the conversion layer is disposed between the reflective mirror layer and the plurality of nanoantenna pattern layers.

4. The beam steering device of claim 2, further comprising an insulating material layer disposed between the conversion layer and the reflective mirror layer.

5. The beam steering device of claim 2, wherein the reflective mirror layer comprises a metal pattern comprising an array of metal portions.

6. The beam steering device of claim 5, wherein an insulating material is disposed between adjacent metal portions in the reflective mirror layer.

7. The beam steering device of claim 2, wherein the reflective mirror layer comprises a substantially uniform metal material.

8. The beam steering device of claim 2, wherein the reflective mirror layer and the plurality of nanoantenna elements each comprise a same metal material.

9. The beam steering device of claim 1, wherein the lower nanoantenna pattern layer comprises an insulating material disposed between adjacent ones of the plurality of nanoantenna elements.

10. The beam steering device of claim 1, comprising a plurality of unit cells, wherein in each of the plurality of unit cells, each of the plurality of nanoantenna pattern layers comprises a plurality of nanoantenna elements.

11. The beam steering device of claim 10, wherein each of the plurality of unit cells comprises a plurality of nanoantenna elements of a same size.

12. The beam steering device of claim 10, wherein a size of the plurality of nanoantenna elements of a first one of the plurality of unit cells is different from a size of the plurality of nanoantenna elements of a second one of the plurality of unit cells.

13. The beam steering device of claim 1, wherein each of the plurality of nanoantenna pattern layers comprises at least one material selected from a group consisting of gold (Au), silver (Ag), titanium nitride (TiN), tantalum nitride (TaN), platinum (Pt), aluminum (Al), and an alloy of one of gold (Au), silver (Ag), titanium nitride (TiN), tantalum nitride (TaN), platinum (Pt), and aluminum (Al).

14. The beam steering device of claim 1, wherein the conversion layer comprises an oxide semiconductor.

15. The beam steering device of claim 1, wherein the conversion layer comprises at least one material selected form a group consisting of indium tin oxide (ITO), indium zinc oxide (IZO), gallium indium zinc oxide (GIZO), zinc oxide (ZnO), aluminum zinc oxide (AZO), and gallium zinc oxide (GZO).

16. A system comprising:
a beam steering device comprising:
a conversion layer comprising a material with a refractive index which is variable via electrical control,
a driver configured to electrically change the refractive index of the conversion layer,
a plurality of nanoantenna pattern layers comprising an upper nanoantenna pattern layer and a lower nanoantenna pattern layer vertically stacked on the conversion layer, such that the lower nanoantenna pattern layer is disposed between the conversion layer and the upper nanoantenna pattern layer, and
an insulating layer disposed between the upper nanoantenna pattern layer and the lower nanoantenna pattern layer,
wherein each of the plurality of nanoantenna pattern layers comprises an array of a plurality of nanoantenna elements, and a size of the nanoantenna elements located in the upper nanoantenna pattern layer is different from a size of the nanoantenna elements located in the lower nanoantenna pattern layer, and
wherein the plurality of nanoantenna pattern layers are configured to steer an incident beam such that the incident beam is reflected at a desired angle;
a driving circuit, electrically connected to the driver, the driving circuit configured to electrically change the refractive index of the conversion layer of the beam steering device via the driver; and
a light source configured to emit the incident beam to the beam steering device.

17. The system of claim 16, further comprising a reflective mirror layer disposed between the conversion layer and the driver.

18. The system of claim 17, wherein a size of each of the plurality of nanoantenna elements and a spacing between adjacent ones of the plurality of nanoantenna elements is smaller than a wavelength of the incident beam.

* * * * *